United States Patent
Wada et al.

(10) Patent No.: US 9,221,184 B1
(45) Date of Patent: Dec. 29, 2015

(54) SHAFT SECTION STRUCTURE OF SCISSORS

(71) Applicants: Yoshikazu Wada, Sakai (JP); Lawrence Y Igarashi, Coto De Caza, CA (US)

(72) Inventors: Yoshikazu Wada, Sakai (JP); Lawrence Y Igarashi, Coto De Caza, CA (US)

(73) Assignee: CHIKAMASA CO., LTD., Osaka (JP)

( * ) Notice: Subject to any disclaimer, the term of this patent is extended or adjusted under 35 U.S.C. 154(b) by 0 days.

(21) Appl. No.: 14/827,209

(22) Filed: Aug. 14, 2015

(30) Foreign Application Priority Data

Jun. 8, 2015 (JP) .................................. 2015-116164

(51) Int. Cl.
*B26B 13/28* (2006.01)
*A01G 3/02* (2006.01)

(52) U.S. Cl.
CPC . *B26B 13/28* (2013.01); *A01G 3/02* (2013.01); *A01G 3/021* (2013.01)

(58) Field of Classification Search
CPC ........... A01G 3/021; A01G 3/02; B26B 13/28
See application file for complete search history.

(56) References Cited

U.S. PATENT DOCUMENTS

| | | | | |
|---|---|---|---|---|
| 663,565 | A * | 12/1900 | Fisher | B26B 13/16 30/261 |
| 1,545,211 | A | 7/1922 | Storz | |
| 1,657,348 | A * | 1/1928 | Drumm | B25B 7/06 30/266 |
| 1,710,456 | A * | 4/1929 | Latimer | B26B 13/00 241/101.01 |
| 2,083,483 | A * | 6/1937 | Strezoff | B26B 13/28 30/195 |
| 2,382,341 | A | 12/1944 | Snell | |
| 2,392,118 | A * | 1/1946 | Cacarillo | B25B 7/08 139/417 |
| 2,626,460 | A | 4/1948 | Wahl | |
| 5,243,762 | A | 9/1993 | Orthey | |
| 5,421,090 | A | 6/1995 | Chiou | |
| 5,499,454 | A | 3/1996 | Compton | |
| 5,628,115 | A * | 5/1997 | Hebert | B25B 7/06 30/261 |
| 5,636,443 | A | 6/1997 | Linden | |
| 5,904,078 | A * | 5/1999 | Gustafson | B25B 7/10 30/261 |
| 6,634,105 | B2 | 10/2003 | Lindermeir | |
| 7,963,192 | B2 | 6/2011 | Mayenberger et al. | |
| 2002/0124415 | A1 * | 9/2002 | Mizutani | B26B 13/16 30/261 |
| 2007/0068006 | A1 * | 3/2007 | Schlichting | B26B 13/00 30/254 |
| 2007/0124945 | A1 | 6/2007 | Hirai | |

FOREIGN PATENT DOCUMENTS

DE  20 2011 107 977 U1 *  1/2012
WO  WO 2006/111383 A1 *  10/2006

* cited by examiner

*Primary Examiner* — Hwei C Payer
(74) *Attorney, Agent, or Firm* — Steven A. Nielsen; www.NielsenPatents.com (57) ABSTRACT

Various scissor embodiments feature channel voids or passages defined within the inside surfaces of scissor blades or shaft sections. The channel voids or passages allow foreign matter to be self-expelled by the movement of the scissor blades. Disclosed blades or shafts are pivotally connected by a new connection assembly that expels foreign matter during the normal use of the scissors. Disclosed embodiments include scissors comprising: a pair of blades (1A, 1B) overlapping each other; and a shaft (3) inserted through a shaft support hole (2) in the blades (1A, 1B) and having a tip (4) that is bucked to allow the blades (1A, 1B) to pivot in an abutting state, a passage communicating with the outside to allow inflow and outflow of water, etc. is formed between abutting faces (5) of both blades (1A, 1B) and between the shaft (3) and the shaft support holes (2).

3 Claims, 9 Drawing Sheets

SHAFT SECTION STRUCTURE OF SCISSORS

RELATED PATENT APPLICATION AND INCORPORATION BY REFERENCE

This is a utility application based upon and claims the priority of Japanese Patent Application No. 2015-116164 filed on Jun. 8, 2015. This related application is incorporated herein by reference and made a part of this application. If any conflict arises between the disclosure of the invention in this utility application and that in the related application, the disclosure in this utility application shall govern. Moreover, the inventor(s) incorporate herein by reference any and all patents, patent applications, and other documents hard copy or electronic, cited or referred to in this application and in the prior application.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION (1) Field of the Invention

The invention generally relates to scissors. More particularly, the invention relates to the use of channel voids within scissor blades and other features to dissipate debris.

(2) Description of the Related Art

Scissors have been known in the related art since the Iron Age. In general, two blades define a pivot void and a contained pivot pin holds the two blades in rotational alignment. The two blades each feature sharpened leading edges that move into each other as the back sides of the blades are squeezed. Scissor blades of the prior art feature planar inside surfaces that smoothly slide upon one another during use. While the smooth planar inside surfaces of the blades and conducive to precise cutting, the smooth inside surfaces are easily fouled with debris when cutting organic matter.

Over the years, many advances have been made in the pivot pin systems that pivotally secure scissor blades. Such advances include the use of screw type pivot pins that allow for precise and lasting adjustment of the friction imposed or tension maintained between the inside blade surfaces. Advances in pivot pins or set screws help scissors maintain consistent cutting performance without premature detachment of the blades. Some modern pivot pin systems allow for consumers to easily disassemble scissor blades for cleaning and precise sharpening.

While there have been advances in the configurations of pivot voids and pivot pins, the prior art fails to address the issue of debris accumulating upon scissor blades and/or within the pivot voids and pivot pins. For example:

U.S. Pat. No. 1,545,211 issued to Storz on Jul. 21, 1922 discloses a pivot piece used to secure two scissor blades in rotational alignment. The Storz pivot insert features an interesting tightening screw system to better secure the pivot pin into the blades.

U.S. Pat. No. 2,382,341 issued to Snell on Aug. 14, 1945 discloses a pin and void system allowing for the blades to be removed after final construction.

U.S. Pat. No. 2,626,460 issued to Sterling on Jan. 27, 1953 discloses a pivot boss system in keeping the blades in pivotal connection.

U.S. Pat. No. 5,421,090 issued to Chiou on Jun. 6, 1995 discloses irregularly shaped leading edges or blade edges used to keep material from sliding off of the blades.

U.S. Pat. No. 5,636,443 issued to Linden on Jun. 10, 1997 discloses a pair of snips using an interlocking blade system to help with the smooth rotation of the blades.

U.S. Pat. No. 6,634,105 issued to Lindermeir on Oct. 21, 2013 discloses pruning shears with means of retaining cutting material close to the blades as coarse bush branches tend to slide off traditional shears. Lindermeir is teaching the confinement of organic material to better cut the material.

U.S. Pat. No. 5,243,762 issued to Orthey on Sep. 14, 1993 discloses garden shears using pivot joint comprising a steel bushing that accommodates shear and flexure loads from the blades. Orthey appears to accommodate the severe forces applied to garden shears but, like the other know prior art, fails to address the need to remove organic matter or other debris.

The Japanese prior art known to date includes:

[PTL 1] Japanese Unexamined Utility Model (Registration) Application Publication No. 05-063467

[PTL 2] Japanese Unexamined Patent Application Publication No. 07-047177

[PTL 3] Japanese Unexamined Patent Application Publication No. 10-179951

[PTL 4] Japanese Unexamined Patent Application Publication No. 2006-181036

[PTL 5] Japanese Unexamined Patent Application Publication No. 08-155157

[PTL 6] Japanese Unexamined Patent Application Publication No. 09-164277

[PTL 7] Japanese Unexamined Patent Application Publication No. 11-221374

Thus, there appears to be a shortfall in the art in that known scissors or shears fail to be self-cleaning or otherwise dispel debris that accumulates within scissor components when cutting organic matter.

For example, gardening scissors or shears used for cutting small branches or for harvesting or thinning out fruits such as grapes tend to accumulate sap, resin or other organic matter upon both the inside blade surfaces and the voids used to secure pins and other means of rotational attachment. Scissor blades are sometimes referred to as shafts or support shafts and pivot voids are sometimes referend to as shaft support holes. Moreover, kitchen scissors used for cutting foodstuff are subjected to fouling between the blades and within the pivot mechanism as foreign objects such as grease and juice are dispersed within the system mechanisms. The smooth planar inside surfaces of prior art scissor blades provide no means of efficient egress for foreign matter.

Shaft section structures of scissors or scissor blades conventionally include a locked shaft type (riveted type) pivot retention system, in which the shaft—for example, a headed rivet—is inserted through the shaft support holes near the centers of the pair of blades, and the tail of the rivet is bucked so that the blades are pivotally supported (see, for example, Patent Literature (PTL) 1 to 4).

In another prior art example, a shaft or blade defines a void wherein a bolt is inserted through a shaft support hole near the center of the pair of blades, and a nut is screwed on to the bolt to pivotally fasten and secure the blades (see, for example, PTL 5 to 7).

Technical Problems or Further Shortfalls in the Prior Art

Cutting with prior art gardening scissors or shears results in sap, twigs, juice, pitch and other foreign matter entering and adhering between the shaft or scissor blades and the shaft support holes or pivot voids causing the opening and closing operation of the blades to become heavy, preventing smooth cutting and causing user fatigue. Furthermore, the same is true for the kitchen scissors which become unhygienic as food stuffs rot within the scissor components.

Among the scissors described in the foregoing background art, with the scissors disclosed in PTL 1 to 4—scissors having the structure in which the shaft is inserted through the shaft support holes of the blades, and the tip of the shaft is bucked so that the blades are pivotally supported sap and other foreign matter that has entered and adhered between the shaft and the shaft support holes obviously cannot be removed even through wiping, and the sap, etc. cannot be washed off or removed even by soaking and rinsing using washing water, hot water, detergent or oil, etc. (hereinafter referred to as water, etc.).

On the other hand, with the scissors disclosed in PTL 5 to 7—scissors having the structure in which the pair of blades are pivotally supported by screwing a nut, or the like, onto the shaft—the sap, etc. that has entered and adhered between the shaft and the shaft support hole can be washed off or removed by loosening the nut to separate the blades and the shaft. However, the washing off or removal task requires the effort of loosening the nut and separating the blades, the shaft, etc., and there is the problem that, when a task of cutting hard objects such as small branches of a tree, for example, is performed repeatedly, the nut that is screwed to the shaft may loosen up causing the cutting quality of the scissors to deteriorate, or the nut may come off causing the shaft to fall off and the blades to separate unexpectedly.

BRIEF SUMMARY OF THE INVENTION

The present invention overcomes shortfalls in the related art by presenting an unobvious and unique combination, configuration and use of channel voids defined within the inside planar blade surfaces, new pivot void configurations defied within scissor blades and by new pivot pin designs.

Disclosed embodiments solve the prior art problems of the conventional shaft section structure of scissors, relating to the washing off or removal of sap, etc. that has entered and adhered between the shaft support holes of the blades and the shaft. In other words, the present invention has as an object to provide a shaft section structure of scissors that allows sap, etc. that has entered and adhered between the shaft support holes of the blades and the shaft to be washed off or removed easily and quickly, without having to separate the blades and the shaft.

The known related art fails to disclose, suggest or teach the use of the disclosed scissor blades with channel voids or passages or the disclosed pivot assemblies.

A shaft section structure of scissors according to an aspect of the present invention is a shaft section structure of scissors, the scissors include: a pair of blades (1A, 1B) overlapping each other; and a shaft (3) inserted through a shaft support hole (2) in each the pair of blades (1A, 1B) and having a tip (4) that is bucked to allow the pair of blades (1A, 1B) to pivot in an abutting state, wherein a passage communicating with an outside of the scissors is formed between abutting faces (5, 5') of the pair of blades (1A, 1B) and between the shaft (3) and the shaft support holes (2).

Specifically, in the scissors having a shaft section in which a pair of blades 1A and 1B are arranged overlapping each other, and shaft 3 is inserted through shaft support holes 2 and tip 4 of shaft 3 is bucked to allow blades 1A and 1B to pivot in an abutting state, one or more grooves a communicating with shaft support holes 2 are formed in abutting face 5 of at least one blade 1A (hereinafter also referred to simply as blade 1A), at least one of the one or more grooves a is formed to extend to the outside of abutting face 5 of blade 1A, one or more grooves b extending laterally are formed in the backside of head 7 of shaft 3, one or more receded portions c are formed along the lateral face of shaft 3 toward tip 4 and communicating with the one or more grooves b, so that the one or more grooves a in blade 1A and the one or more grooves b and the one or more receded portions c in shaft 3 communicate.

In the aforementioned configuration, groove a formed in the underside—abutting face 5—of blade 1A forms a passage together with abutting face 5' of the other blade 1B (hereinafter also referred to simply as blade 1B). However, the planar shape of groove is arbitrary and groove a is not limited to one and may be plural in number. In addition, at least one of grooves extends toward the outside of abutting face 5, where opening 8 is formed.

Furthermore, instead of having direct communication between groove a in blade 1 and shaft support hole 2, recess 6 may be formed around support hole 2 and groove a and shaft support hole 2 may communicate via recess 6.

Groove b in the underside of head 7 of shaft 3 forms a passage together with the top side of blade 1A, and groove c in the lateral face of shaft 3 forms a passage with the inner circumferential face of shaft support hole 2 of blade 1A. The number of grooves b and receded portions c is not limited to one and forming two or more of each is preferable.

Although the groove that is formed in the blade is formed in the abutting face 5 of at least blade 1A as described above, the present invention is not limited to such. In addition, a groove may also be formed in abutting face 5' of blade 1B (see, for example, FIG. 12 and FIG. 13).

Further Advantages Over the Prior Art

The advantageous effects of scissors having the shaft section structure according to the aforementioned configuration are as follows.

First, the cutting task may be performed in the same manner as conventional scissors of this type. However, when the cutting task is performed repeatedly, sap, etc. adheres to the surface, etc. of the shaft section of both blades 1A and 1B.

Normally, the sap, etc. may be washed off or removed by filling a container with water, etc. for washing, shaking and moving the scissors in the container, and opening and closing blades 1A and 1B. With this, the sap, etc. that has adhered to the surface of both blades 1A and 1B and the shaft section are easily and quickly washed off or removed.

On the other hand, the sap, etc. that has entered and adhered to shaft 3 and the shaft section of both blades 1A and 1B, that is, between shaft support holes 2 and shaft 3 cannot be easily washed off or removed in conventional scissors other than the separable type. However, with the scissors having the proposed structure of the shaft section, the sap, etc. can be easily and quickly washed off by shaking and moving the scissors in the container, and opening and closing blades 1A and 1B.

This is because in the proposed scissors, one or more grooves a are formed in abutting face 5 which is the underside of at least blade 1A, with at least one of grooves a extending toward the outside of abutting face 5 of blade 1A. Furthermore, in shaft 3, one or more grooves b extending laterally are formed in the backside of head 7 of shaft 3 to communicate with grooves a, and one or more receded portions c extending toward tip 4 of shaft 3 are formed in the lateral face of shaft 3 to communicate with grooves b. This enables communication between grooves a in blade 1A and grooves b and receded portion c in shaft 3.

Figure 5:
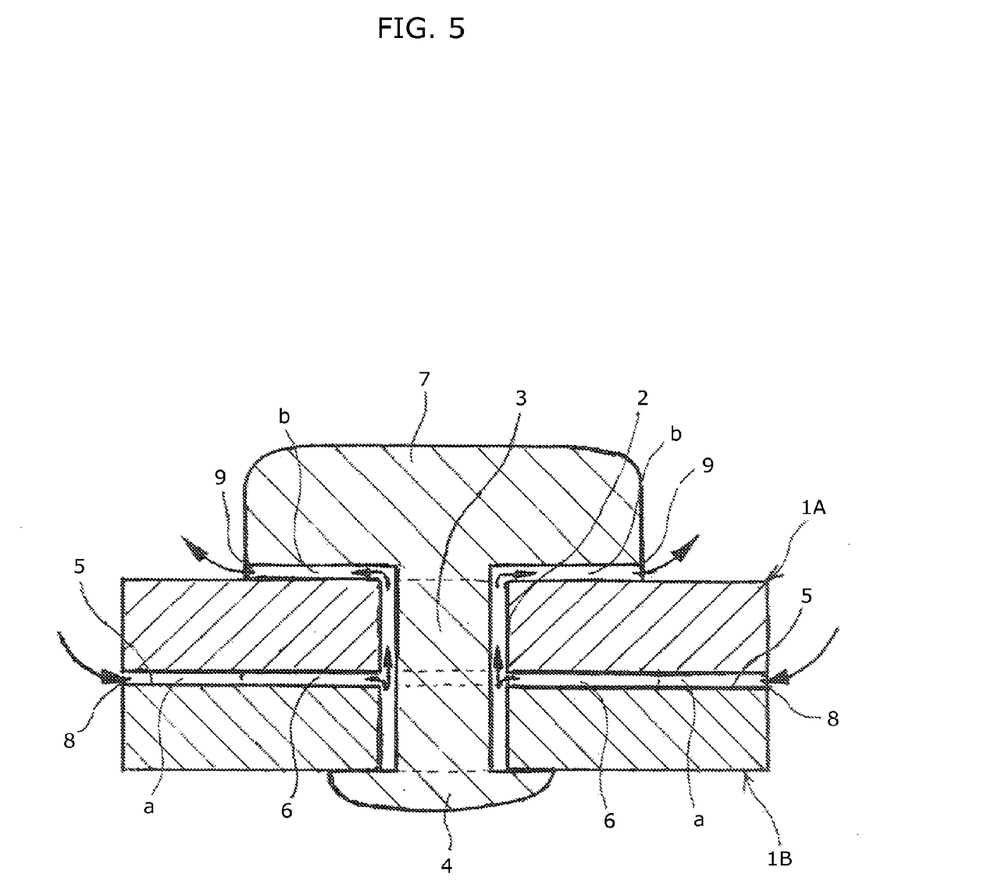
FIG. 5 is an enlarged longitudinal section view of the scissors illustrated in FIG. 4, illustrating inflow and outflow of water, etc. for washing.

Accordingly, by shaking and moving the scissors inside the container and opening and closing both blades 1A and 1B, the water, etc. for washing in the container enters from opening 8 of grooves a in abutting face 5 of blade 1A, passes through the inside of grooves a, and flows into the shaft section in the center, and then passes through receded portions c in the lateral face of shaft 3 which communicates with grooves a, flows to grooves b in the underside of head 7, and flows out from opening 9 of grooves b (see for example FIG. 5).

Figure 6:
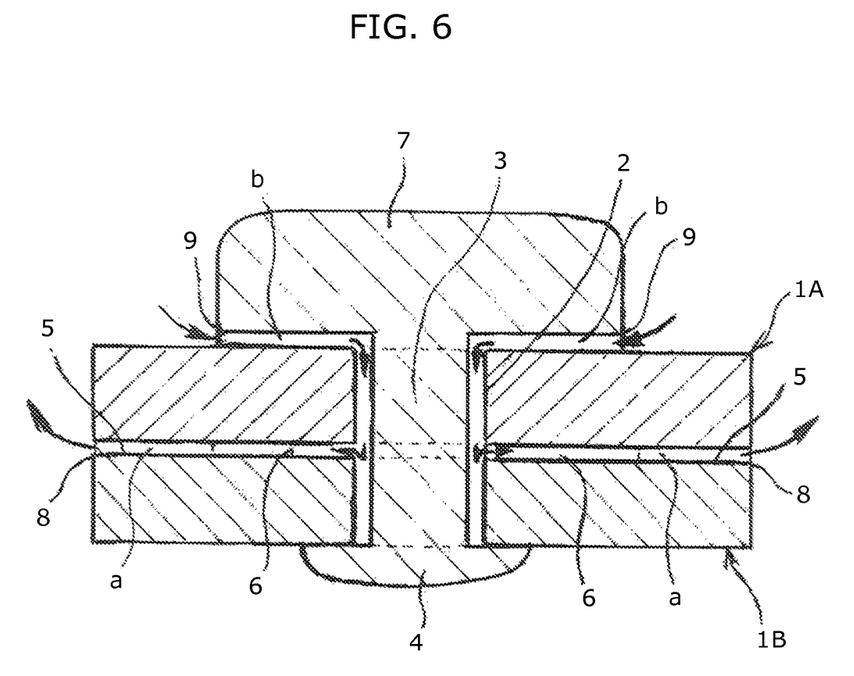
FIG. 6 is an enlarged longitudinal section view of the scissors illustrated in FIG. 4, illustrating reverse-course inflow and outflow of water, etc. for washing.

Alternatively, in a reverse course, the water, etc. for washing enters from opening 9 of grooves b in the underside of head 7, passes between grooves b and the top side of blade 1A, and flows into the shaft section at the center, and then passes receded portions c in the lateral face of shaft 3, flows outward through grooves a in abutting face 5 of blade 1A which communicates with receded portions c, and flows out from opening 8 (see for example FIG. 6).

In this manner, the water, etc. for washing flows in and out of the shaft section, and thus sap, etc. that has entered and adhered in the gap between shaft 3 and shaft support holes 2 easily flows out and is washed off or removed.

When a plurality of grooves a in abutting face 5 of blade 1A, grooves b in the backside of head 7, and receded portions c in the lateral side of shaft 3 are provided in the foregoing description, the inflow and outflow of the water etc. for washing takes place efficiently, and thus the washing off or removal of the sap, etc. that has entered and adhered between shaft 3 and shaft support holes 2 can be performed even more easily and quickly.

Furthermore, as described above, grooves a' may also be formed in abutting face 5' of blade 1B in addition to grooves a formed in abutting face 5 of blade 1A. In such a case, the cross-sectional area of the passage formed by opposing grooves a and a' is twice as large as when grooves are formed in only one blade, and thus washing off or removal can be performed more effectively. If it is sufficient to have the same flow rate as when grooves are formed in only one blade, the depths of respective grooves a and a' can be made shallower (see, for example, FIG. 13).

It should be noted that although the washing off or removal task is described as being performed by soaking the scissors in water, etc. for washing that is placed in a container, it is not limited to such, and may be performed by spraying water, etc. for washing or by air blowing (air spraying). In all such cases, in the shaft section structure according to an aspect of the present invention, water, etc. for washing or air flows in and out of the shaft section by passing through grooves a and b, receded portions c, and recess 6, etc., and thus the washing off or removal task can be performed even more easily and efficiently.

REFERENCE NUMERALS IN THE DRAWINGS

1A, 1B scissor blade
2 shaft support hole or pivot void defined within a scissor blade
3 shaft or pivot pin
4 tip or lower surface of a shaft 3
5, 5' abutting face or inner planar surface of a blade
6, 6' recess or circular void defined within an inner planar blade surface, the circular void concentric with the shaft support hole 2 or pivot void
7 head attached to the shaft 3
8, 8' opening or exit void at end of a channel void "a"
9, opening, channel or void defined within a lower surface of the head
a, a' groove or channel void defined within a blade
b groove defined within the head 7
c receded portion or flat vertical section of shaft 3

These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

One or more grooves a communicating with shaft support hole 2 are formed in abutting face 5 of at least one blade 1A, with at least one of grooves a formed to extend toward the outside of abutting face 5 of blade 1A. In shaft 3, one or more grooves b extending laterally are formed in the underside of head 7 of shaft 3 and one or more receded portions c are formed along the lateral face of shaft 3 toward tip 4 and communicating with grooves b. Accordingly, grooves a in blade 1A and grooves b and receded portions c in shaft 3 communicate.

Embodiment 1

FIG. 1 to FIG. 7 illustrate a shaft section according to Embodiment 1 of the present invention as used in gardening scissors, and is of the locked shaft type (riveted type) in which a pair of blades 1A and 1B are arranged overlapping each other, shaft 3 is inserted through shaft support holes 2 of blades 1A and 1B, and tip 4 of shaft 3 is bucked to allow blades 1A and 1B to pivot in an abutting state.

Figure 1:
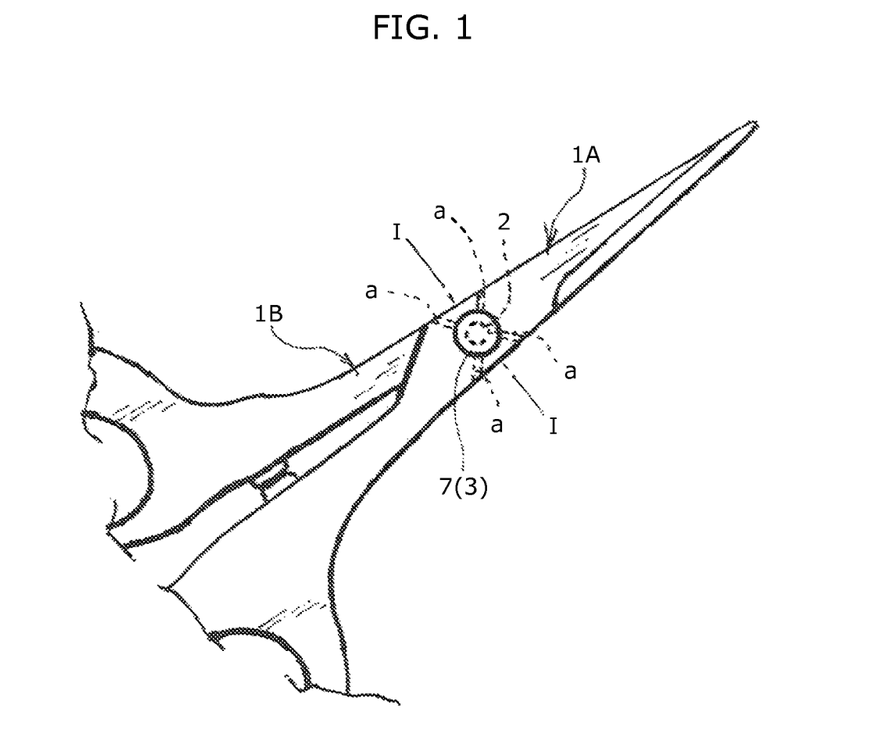
FIG. 1 is a perspective view of scissors according to Embodiment 1 of the present invention.
Figure 2:
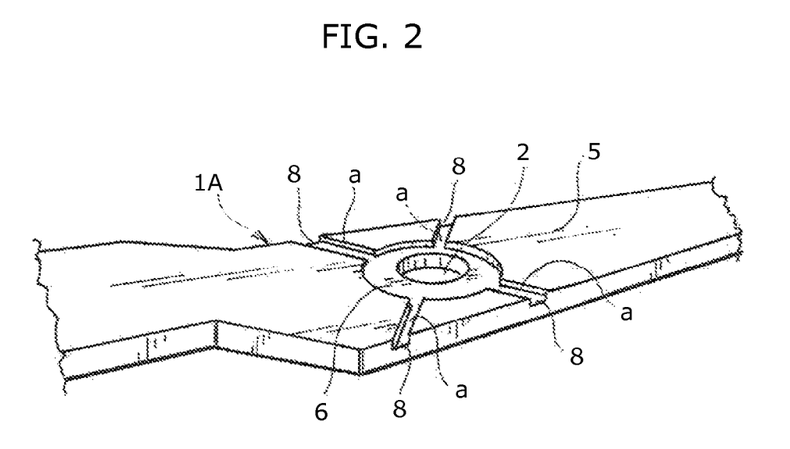
FIG. 2 is an enlarged perspective view of main parts on an underside of one of blades used in the scissors illustrated in FIG. 1.
Figure 7:
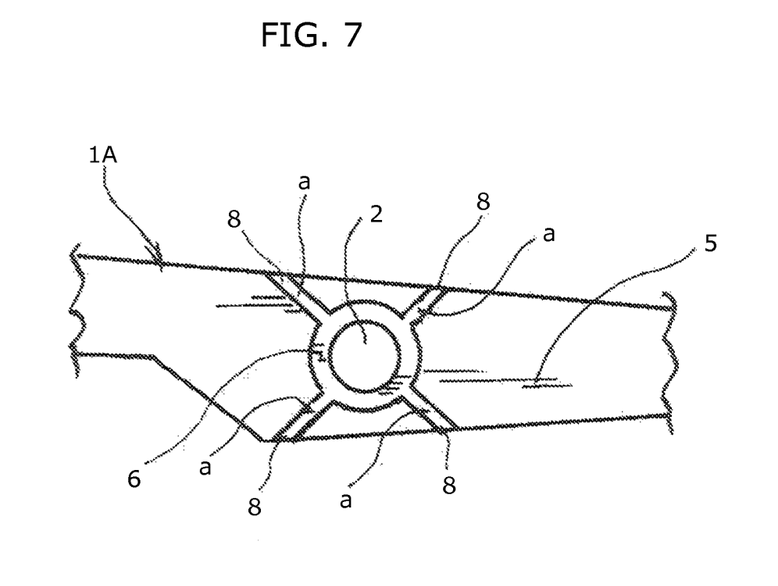
FIG. 7 is top view of the main parts of the one blade illustrated in FIG. 2.

In the aforementioned scissors, four grooves a are formed in abutting face 5 of one blade 1A (hereinafter also referred to simply as blade 1A), extending from shaft support hole 2 and recess 6 around shaft support hole 2 toward the outside, here, in a radial pattern. Each groove a extends toward a lateral edge of blade 1A and has opening 8 formed at the leading end. It should be noted that, here, each groove a is formed to have a depth of approximately 0.5 mm and a width of 0.77 mm. Grooves a form, together with the abutting face of the other blade 1B, passages that allow water, etc. for washing and air to pass. It should go without saying that the depth and width of grooves a are different depending on the kind of scissors.

Figure 3:
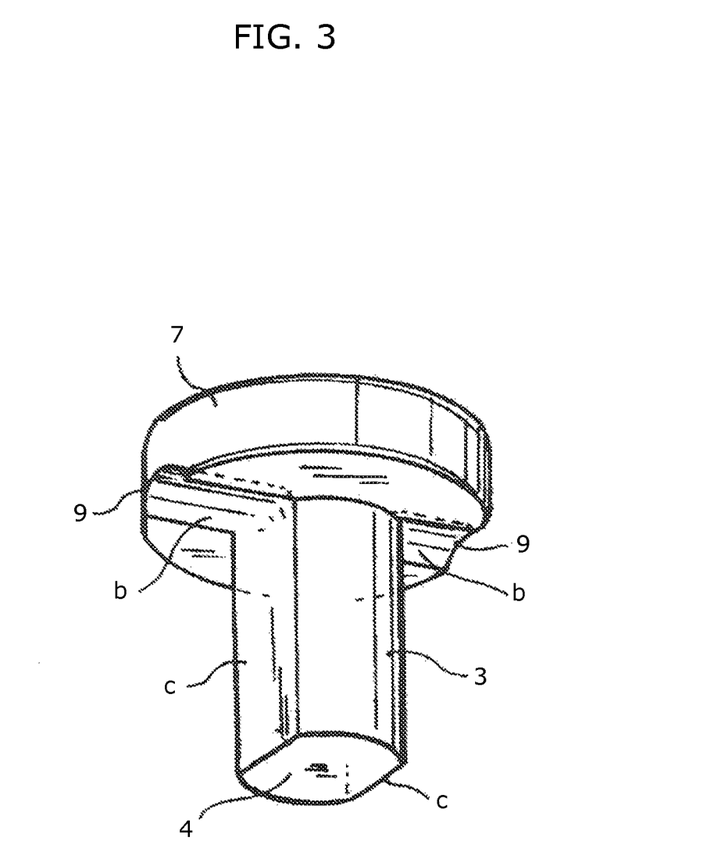
FIG. 3 is an enlarged perspective view of a shaft used in the scissors illustrated in FIG. 1.
Figure 4:
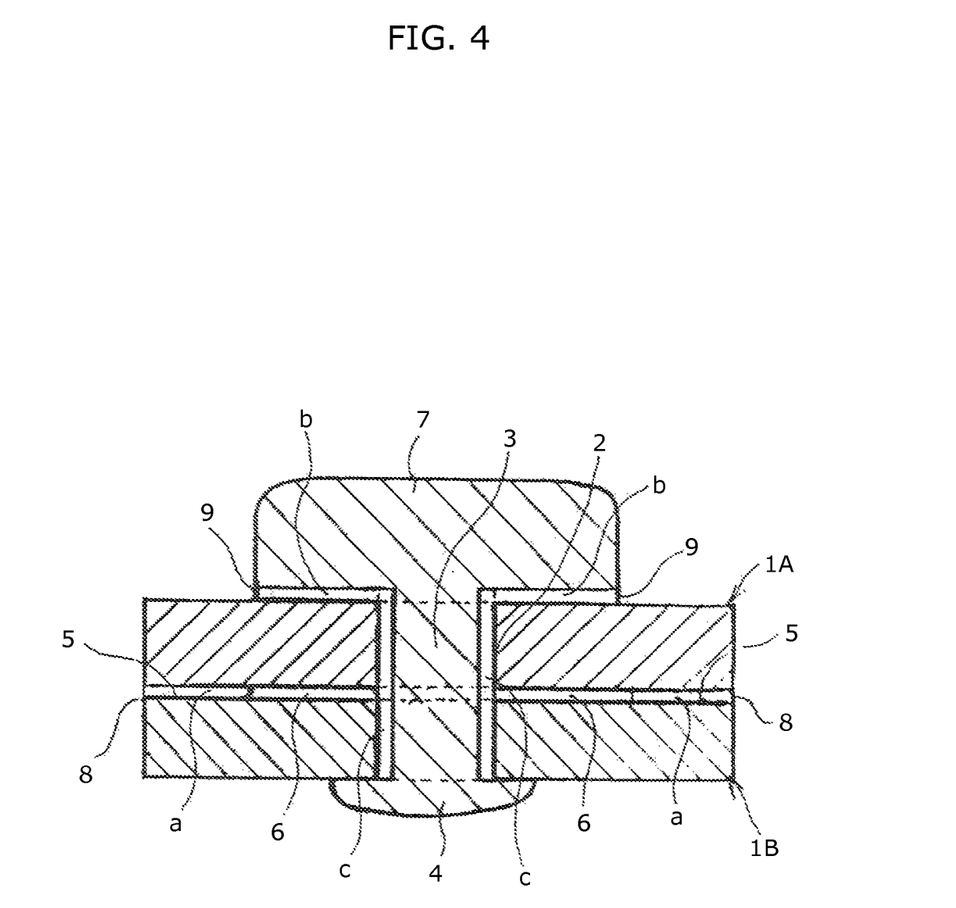
FIG. 4 is an enlarged cross-sectional view of a vertical section of the scissors illustrated in FIG. 1, taken at line I-I.

Here, a stainless steel rivet is used for shaft 3 which is inserted through respective shaft support holes 2 in both blades 1A and 1B, and tip of the shaft is bucked to prevent shaft 3 from falling out. In addition, two grooves b are formed in the underside of head 7 of shaft 3, extending toward opposite sides with shaft 3 as the center and having opening 9 formed at the sideward end (i.e., the end away from the center) of each groove b.

Furthermore, two receded portions c are formed at opposed positions in the lateral face of shaft 3, extending toward the direction of the tip of shaft 3 and communicating with corresponding grooves b in the underside of head 7. Receded portions c in the lateral face of the shaft is not formed in the shape of a groove, and is formed by planarizing a portion of the lateral face of the shaft at opposed positions toward tip 4. However, receded portions c are not limited to such, and may be formed in a concave shape in the same manner as above-described grooves a and grooves b. Receded portions c form, together with the inner circumferential face of shaft support holes 2, passages that allow water, etc. for washing to pass. Furthermore, receded portions c communicates with grooves a in abutting face 5 of blade 1A, at an approximately central position in the longitudinal direction of receded portions c.

It should be noted that although recess 6 has a circular plan view shape in the foregoing embodiment, recess 6 is not limited to such, and may be of another shape such as rectangular, etc. (illustration omitted). Furthermore, the positions, shape, and number of grooves is not limited to those in the foregoing description. Groove a, groove b, receded portion c, etc. may be formed by, for example, press working or machining. It should go without saying that the materials, dimensions, etc. described above are also examples and thus non-limiting.

Variations

Scissors illustrated in FIG. 8 to FIG. 11 are variations of the scissors according to Embodiment 1. All of these scissors are the same as the scissors in Embodiment 1 in terms of being locked shaft type (riveted type) scissors, but are different from the scissors in Embodiment 1 in terms of the shape and/or number of grooves a and recess 6 which are formed in the underside—abutting face 5—of blade 1A.

Figure 8:
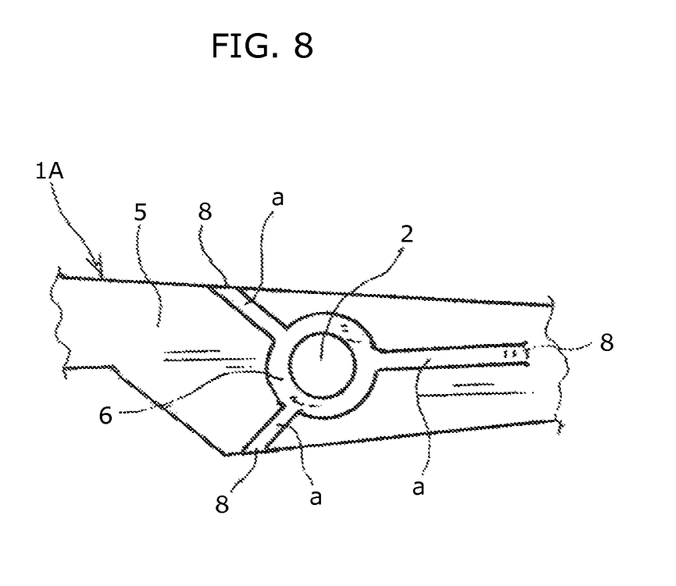
FIG. 8 is a view of main parts of one blade in a variation.

First, in the scissors illustrated in FIG. 8, two grooves a are formed along abutting face 5, extending in an obliquely backward direction from recess 6 formed around shaft support hole 2 of blade 1A, and having respective openings 8 at both lateral edges of the blade. Furthermore, one groove a is also formed extending toward the tip of blade 1A.

Figure 9:
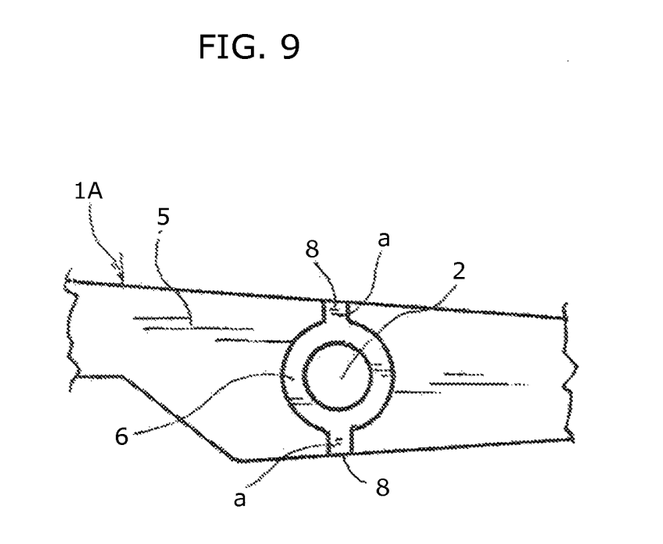
FIG. 9 is a view of main parts of one blade in another variation.

In the scissors illustrated in FIG. 9, two grooves a are formed along abutting face 5, extending from recess 6 formed around shaft support hole 2 of blade 1A to the lateral edges of the blade, and having respective openings 8 at both lateral edges.

Figure 10:
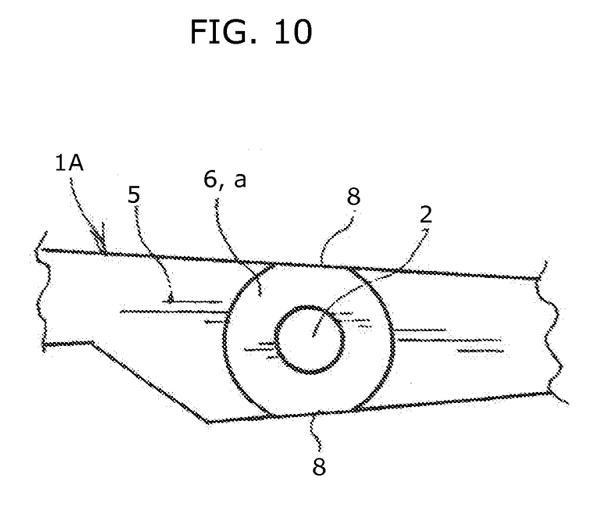
FIG. 10 is a view of main parts of one blade in yet another variation.

In the scissors illustrated in FIG. 10, recess 6 around shaft support hole 2 of blade 1A is shaped like a circle having a width that reaches both lateral edges of blade 1A so that recess 6 also serves as grooves a. Stated differently, groove a also serves as recess 6.

Figure 11:
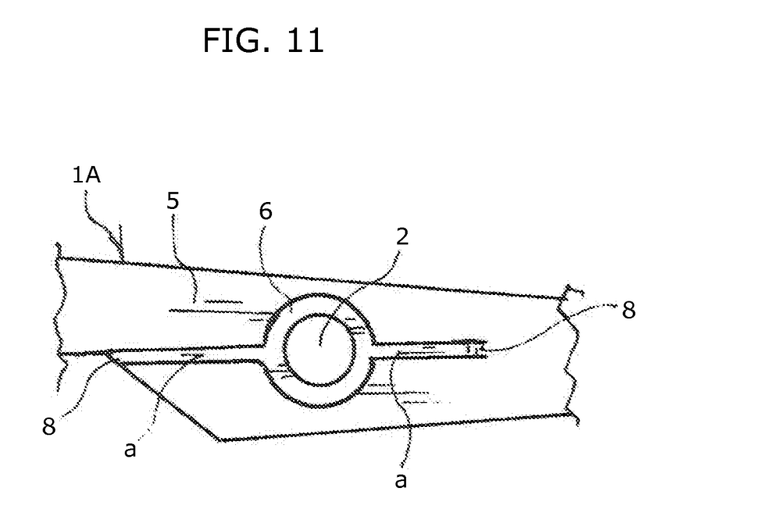
FIG. 11 is a view of main parts of one blade in another variation.

In the scissors illustrated in FIG. 11, a single groove a is formed along abutting face 5, extending backward from recess 6 around shaft support hole 2 of blade 1A and having opening 8 formed at the backward end thereof, as well as extending toward the tip of blade 1A.

Embodiment 2

Figure 12:
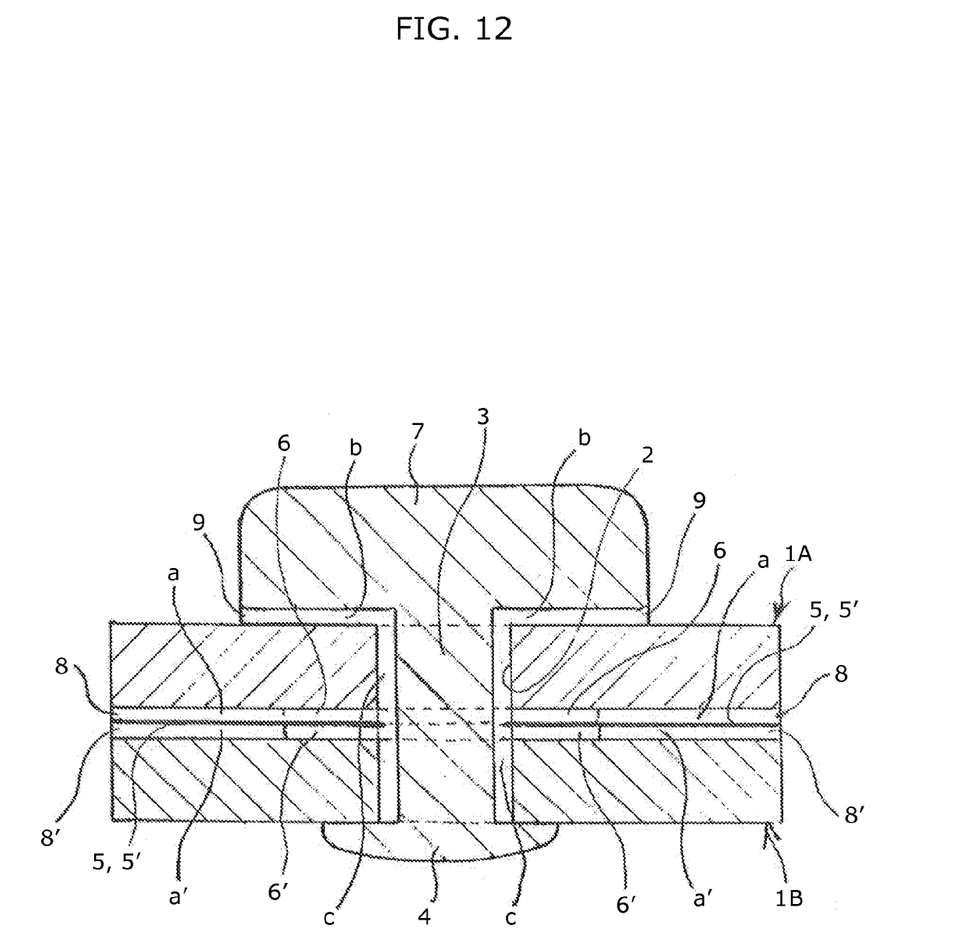
FIG. 12 is an enlarged cross-sectional view of main parts in Embodiment 2.
Figure 13:
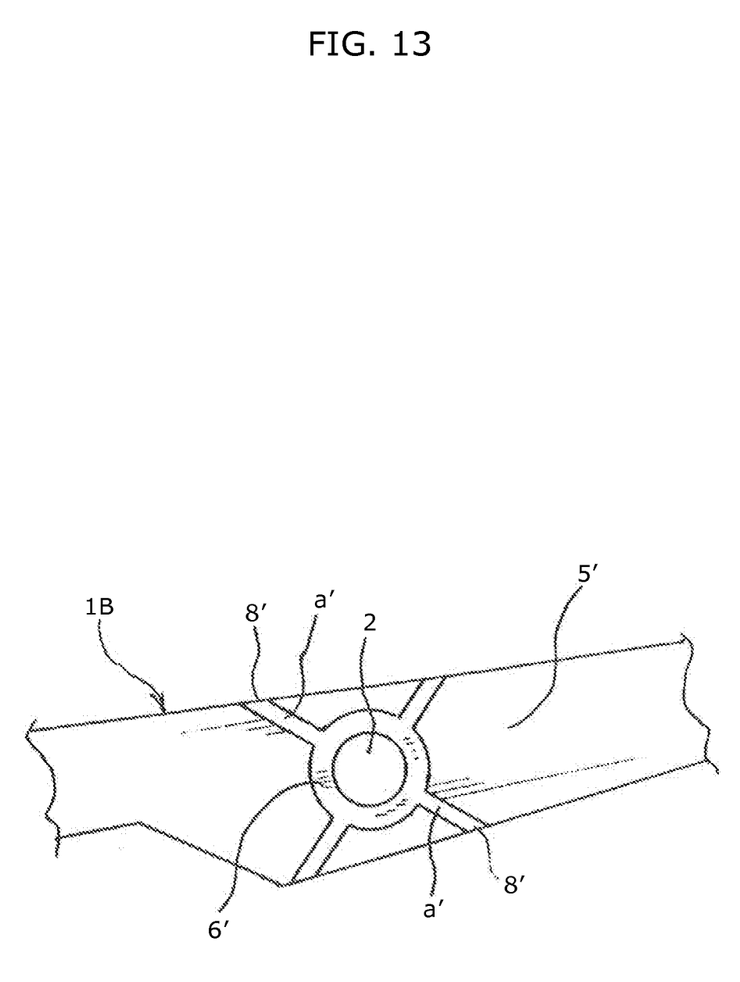
FIG. 13 is a plan view of main parts of the other blade used in Embodiment 2.

FIG. 12 and FIG. 13 illustrate a shaft section structure according to Embodiment 2 of the present invention as used in gardening scissors. Here, in addition to forming grooves a and recess 6 in abutting face 5 of blade 1A as in Embodiment 1, grooves a' and recess 6' are also formed in the other blade 1B (see, for example, FIG. 12 and FIG. 13).

Specifically, here, in a pattern that mirrors the pattern in abutting face 5 of blade 1A, recess 6' and four grooves a' are also formed in abutting face 5' of the other blade 1B. Recess 6' is formed around shaft support hole 2, and the four grooves a' are formed extending from shaft support hole 2 and recess 6' around shaft support hole 2 toward the outside in a radial pattern, with each groove a' having an opening 8' formed at the leading end. Accordingly, passages each having a cross-sectional area equivalent to the sum of the depths of opposing grooves a and a' are formed between respective abutting faces 5 and 5' of both blades 1A and 1B. Therefore, water, etc. for washing or air passes through more smoothly, and thus washing off or removal of sap, etc. can be performed effectively.

INDUSTRIAL APPLICABILITY

For scissors of the locked shaft type (riveted type) in which the tip of shaft 3 inserted through shaft support holes 2 of both blades 1A and 1B is bucked to pivotally support both blades 1A and 1B, there is a need for scissors that allow the sap, etc. that has entered and adhered between shaft 3 and shaft support holes 2 during a cutting task to be washed off or removed easily and quickly. The present invention which answers this need is useful and in great demand in fields such as horticulture and food preparation.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

Disclosed embodiments may also include the following items.

Item 1. A shaft section structure of scissors, the scissors including: a pair of blades overlapping each other; and a shaft inserted through a shaft support hole in each the pair of blades and having a tip that is bucked to allow the pair of blades to pivot in an abutting state, wherein a groove is provided between abutting faces of the pair of blades and between the shaft and the shaft support holes to form a passage communicating with an outside of the scissors.

Item 2. The shaft section structure of scissors according to 1, wherein a recess and a first groove are formed in an abutting face of at least one of the pair of blades, the recess being formed around the shaft support hole, and the first groove communicating with the recess and the shaft support hole.

Item 3. The shaft section structure of scissors according to 1, wherein a second groove is formed in an underside of a head of the shaft that is inserted through the shaft support holes, the second groove extending laterally and communicating with a first groove formed in at least one of the pair of blades.

Item 4. The shaft section structure of scissors according to 1, wherein a receded portion is formed in a lateral face of the shaft, the receded portion extending toward the tip of the shaft and communicating with a second groove formed in an underside of a head of the shaft.

Item 5. The shaft section structure of scissors according to 1, wherein a recess and one or more first grooves are formed in an abutting face of at least one of the pair of blades, and an opening to the outside is formed in at least one of the one or more first grooves, the recess being formed around the shaft support hole, and the one or more first grooves communicating with the shaft support hole and the recess, one or more second grooves extending laterally are formed in an underside of a head of the shaft, and an opening to a side of the head is formed in at least one of the one or more second grooves, one or more receded portions extending toward the tip of the shaft are formed in a lateral face of the shaft, each of the one or more receded portions communicating with a corresponding one of the one or more second grooves, and communicating with the one or more first grooves at a section of the one or more receded portions, and the one or more first grooves in the at least one of the pair of blades, and the one or more second grooves and the one or more receded portions in the shaft communicate with the outside.

Item 6. The shaft section structure of scissors according to 1, wherein a recess and one or more first grooves are formed in an abutting face of one of the pair of blades, and an opening to the outside is formed in at least one of the one or more first grooves, the recess being formed around the shaft support hole, and the one or more first grooves communicating with the shaft support hole and the recess, one or more second grooves extending laterally are formed in an underside of a head of the shaft, and an opening to a side of the head is formed in at least one of the one or more second grooves, one or more receded portions extending toward the tip of the shaft are formed in a lateral face of the shaft, each of the one or more receded portions communicating with a corresponding one of the one or more second grooves, a recess and one or more first grooves are formed in an abutting face of the other of the pair of blades in a pattern that mirrors a pattern in the abutting face of the one of the pair of blades, and an opening to the outside is formed in at least one of the one or more first grooves, the recess being formed around the shaft support hole, and the one or more first grooves communicating with the shaft support hole and the recess, and the one or more first grooves in the abutting face of each of the pair of blades are formed to communicate with the one or more receded portions at a section of the one or more receded portions.

The invention claimed is:

1. A pair of scissors comprising:
   a first blade (1A) and a second blade (1B) each having an abutting face (5) overlapping each other;
   a shaft (3) inserted through a shaft support hole (2) in each of the blades (1A,1B) and having a tip (4) that is bucked to allow the blades (1A,1B) to pivot in an abutting state;
   a recess (6) and at least one first groove (a) formed in the abutting face (5) of the first blade (1A), the recess (6) being formed around the shaft support hole (2) of the first blade (1A), and the at least one first groove (a) communicating with the recess (6) and the shaft support hole (2) of the first blade (1A);
   at least one second groove (b) formed in an underside of a head (7) of the shaft (3) that is inserted through the shaft support holes (2) of the blades (1A,1B), at least one receded portion (c) formed in a lateral face of the shaft (3) and extending toward the tip (4) of the shaft (3), the at least one second groove (b) extending laterally and communicating with the at least one receded portion (c); and
   the recess (6), the at least one first groove (a), the at least one second groove (b), and the at least one receded portion (c) forming a passage communicating with an outside of the scissors.

2. The pair of scissors according to claim 1 further comprising:
   a recess (6') and at least one first groove (a') formed in the abutting face (5') of the second blade (1B);
   an opening (8') to the outside formed in the at least one first groove (a') of the second blade (1B), the recess (6') of the second blade (1B) formed around the shaft support hole (2) of the second blade (1B), and the at least one first groove (a') of the second blade (1B) communicating with the shaft support hole (2) of the second blade (1B) and the recess (6') of the second blade (1B);

an opening (9) to a side of the head (7) formed in the at least one second groove (b), the at least one receded portion (c) communicating with the at least one second groove (b) and with the at least one first groove (a') of the second blade (1B) at a section of the at least one receded portion (c); and the at least one first groove (a,a') in each blades (1A,1B), the at least one second groove (b), and the at least one receded portion (c) in the shaft (3) communicating with the outside.

3. The pair of scissors according to claim 1 further comprising:

an opening (8) to the outside being formed in the at least one first groove (a) of the first blade (1A), the recess (6) being formed around the shaft support hole (2) of the first blade (1A), and the at least one first groove (a) communicating with the shaft support hole (2) of the first blade (1A) and the recess (6);

an opening (9) to a side of the head (7) being formed in the at least one second groove (b), a recess (6') and at least one first groove (a') being formed in the abutting face (5') of the second blade (1B) in a pattern that mirrors a pattern in the abutting face (5) of the first blade (1A), and an opening (8') to the outside being formed in the at least one first groove (a') of the second blade (1B), the recess (6') of the second blade (1B) being formed around the shaft support hole (2) of the second blade (1B), and the at least one first groove (a') of the second blade (1B) communicating with the shaft support hole (2) of the second blade (1B) and the recess (6') of the second blade (1B); and the at least one first groove (a,a') in the abutting face (5,5') of each blade (1A,1B) being formed to communicate with the at least one receded portion (c) at a section of the at least one receded portion (c).

* * * * *